United States Patent [19]
Kikuchi et al.

[11] Patent Number: 5,784,511
[45] Date of Patent: Jul. 21, 1998

[54] CONNECTOR WITH MAGNET BEING HELD TO AN APPARATUS FOR DATA TRANSMISSION/RECEPTION

[75] Inventors: Akihiro Kikuchi, Chiba; Takashi Masuda, Kanagawa; Yoshio Kondo, Chiba, all of Japan

[73] Assignee: Sony Corporation, Tokyo, Japan

[21] Appl. No.: 783,245

[22] Filed: Jan. 14, 1997

[30] Foreign Application Priority Data

Jan. 19, 1996 [JP] Japan .................................. 8-007845
Jul. 26, 1996 [JP] Japan .................................. 8-197547

[51] Int. Cl.⁶ .................................................. G02B 6/38
[52] U.S. Cl. ............................................ 385/57; 385/53
[58] Field of Search ............................ 385/57, 53–58

[56] References Cited

U.S. PATENT DOCUMENTS

| | | | |
|---|---|---|---|
| 4,844,582 | 7/1989 | Giannini | 385/57 |
| 4,903,340 | 2/1990 | Sorensen | 385/57 X |
| 5,295,212 | 3/1994 | Morton et al. | 385/57 |

FOREIGN PATENT DOCUMENTS

| | | |
|---|---|---|
| 2424554 | 11/1979 | France . |
| 2566195 | 12/1985 | France . |
| 2503033 | 7/1976 | Germany . |
| 62-102205 | 5/1987 | Japan . |
| 62-240912 | 10/1987 | Japan . |
| 63-058408 | 3/1988 | Japan . |

*Primary Examiner*—Phan T.H. Plamer
*Attorney, Agent, or Firm*—Jay H. Maioli

[57] ABSTRACT

A connector apparatus for interconnecting at least two electronic apparatuses, such as a personal computer and a printer, interconnects input/output units of the equipment each having a light emitting element and a light receiving element. The connector apparatus enables data transmission/reception between the equipment. The connector apparatus includes at least two optical fibers and a pair of connecting units. The connecting units include a pair of connecting portions for holding both ends of the optical fibers. Each connecting portion has a magnet portion for attracting by the equipment and a limiting portion for limiting the rotational position at the time of connection to the equipment. With the ends of the optical fibers connected by the connecting portions to the electronic equipment, the ends of the optical fibers are held in the state of enabling data transmission/reception with the input/output units of the equipment.

22 Claims, 6 Drawing Sheets

CONNECTOR WITH MAGNET BEING HELD TO AN APPARATUS FOR DATA TRANSMISSION/RECEPTION

BACKGROUND OF THE INVENTION

1. Field of the Invention

This invention relates to a connector apparatus. More particularly, it relates to a connector apparatus for interconnecting at least two pieces of electronic equipment.

2. Description of the Related Art

The radio transmission technique for transmitting data signals using infrared rays is extensively applied for remote control for video or audio equipment such as a television receiver or tape recorder. In keeping up with widespread use of the information processing systems, such as a personal computer, this sort of radio signal transmission technique is also applied as a transmission technique for data signals for interconnecting a main computer unit and its peripheral or terminal devices. The design statement for this sort of signal transmission technique is prescribed as Infra-red Data Association (IrDA) standard.

The radio signal transmission system under the IrDA standard is characterized by low output, directivity with the center angle of 15°, short-range communication up to 1 m and one-for-one or one-for-N inter-equipment interconnections. Therefore, the radio signal transmission based on the IrDA standard has a number of meritorious effects, such that data transmission can be done easily by installing the equipment loaded with the corresponding functions in proximity to each other, painstaking interconnection operations or mistaken interconnections may be eliminated, that spatial efficiency may be improved by eliminating numerous connection cables, and that power source processing can be simplified by electrically separating the equipment.

The equipment conforming to the IrDA standard, as described above, include IR emitting devices and PIN photodiodes (light-receiving elements) as a light-emitting module and as a light receiving element, respectively, and a data transmission/reception unit in a casing of the equipment for facing the light-emitting and light-receiving elements. The transmission unit of the data transmission/reception device includes, along with the light emitting element for converting an electrical signal into a light signal and outputting the resulting light signal, a modulator for transforming data signals transmitted from a communication controller UART into electrical signals and a transmission/reception circuit for driving the light emitting element.

The receiving unit of the data transmission/reception device is made up of the light receiving element for transferring a light signal into an electrical signal and a reception circuit for amplifying and wave-shaping the photo-electrical signal received by the light receiving element. In the IrDA standard, a state devoid of an IR signal is defined as "1", while a state in which an IR pulse of 1.6 s to 3/16 bit time has been detected is defined as "0". Therefore, the receiving unit includes an IR filter for reducing white noise, removing optical noise, such as IR light of a non-specified wavelength or extraneous light, and for correctly detecting the specified IR rays.

Meanwhile, a computer system is made up of a main computer unit 1 and plural peripheral devices, such as a monitor 2, a keyboard 3, a printer 4 or an external memory 5, as shown in FIG. 1, and data signals can be transmitted between the unit or devices making up the system. To this end, various system equipment are usually interconnected by a connector cable, such that a large number of connection cables deteriorate the spatial efficiency, while raising various inconveniences, such as mistaken interconnections.

In such computer systems, transmission of data signals between the unit or devices making up the system can be performed without using connection cables by exploiting the radio signal transmission system for data signals employing infrared rays based on the above-described IrDA standard, as shown in FIG. 1.

On the other hand, portable equipment, such as notebook type personal computers or portable information terminal equipment, also have come into widespread use. In the portable equipment, attempts are being made for introducing a radio signal transmission system for data signals by employing the above-mentioned IrDA standard enabling transmission of data signals between an associated unit or devices without the necessity of providing dedicated connection cables.

The radio signal transmission system for data signals, based on the IrDA standard, has such defects that the data signal transmission distance is as short as approximately 1 m, power consumption is large and the system is weak against optical noise. The radio signal transmission system for data signals, based on the IrDA standard, has an additional defect that, since there is no means for confirming that data transmission is being performed correctly between the unit or devices, the user feels uneasy as to whether or not data communication is actually proceeding correctly.

For example, in the above-described computer system, it is extremely difficult to install the unit or devices making up the system so that the data transmission/reception devices will be located within the center angle of 15°. Therefore, in the computer system, plural data transmission/reception devices are provided in the main computer unit 1, as shown in FIG. 1, so that the peripheral devices, namely the monitor 2, keyboard 3, printer 4 or the external memory 5 will be interconnected in a one-for-one relationship with the main computer unit 1 as the center. The result is that the main computer unit 1 is complex and bulky in size, while being costly.

Moreover, the above-described computer system has a drawback that the unit or devices are placed on a table in a disorderly state, such that, if documents or files are placed between the main computer unit 1 and the peripheral devices or if the user extends his or her hand or arm into the space between the unit and the peripheral devices, data signal transmission is interrupted transiently.

SUMMARY OF THE INVENTION

It is therefore an object of the present invention to provide a connector apparatus which resolves the above-mentioned problems.

In one aspect, the present invention provides a connector apparatus for interconnecting at least two pieces of electronic equipment each having an input/output unit including a transmission portion and a reception portion for enabling data transmission/reception between the electronic equipment. The connector apparatus includes at least a cable and a pair of connecting portions provided at both ends of the cable. Each connecting portion has a magnet portion for attracting the equipment and a limiting portion for limiting the rotational position at the time of connection thereof to the equipment. With the ends of the cable connected by the connecting portions to the electronic equipment, the ends of the cable are held in the state of enabling data transmission/reception with the input/output units of the equipment.

In another aspect, the present invention provides a connector apparatus for interconnecting at least two pieces of electronic equipment each having an input/output unit including a transmission portion and a reception portion for enabling data transmission/reception between the electronic equipment. The connector apparatus includes at least two cables and a pair of connecting portions for holding both ends of the cables, each connecting portion having a magnet portion for attracting the equipment and a limiting portion for limiting the rotational position at the time of connection thereof to the equipment. With the ends of the cables connected by the connecting portions to the electronic equipment, the ends of the cables are held in the state of enabling data transmission/reception with the input/output units of the equipment.

In yet another aspect, the present invention provides a connector apparatus for interconnecting at least two pieces of electronic equipment each having an input/output unit including a light emitting portion and a light receiving portion for enabling data transmission/reception between the electronic equipment. The connector apparatus includes at least two optical fibers and a pair of connecting portions for holding both ends of the optical fibers, each connecting portion having a magnet portion for attracting the equipment and a limiting portion for limiting the rotational position at the time of connection thereof to the equipment. With the ends of the optical fibers connected by the connecting portions to the electronic equipment, the ends of the optical cables are held at positions facing the input/output unit.

DESCRIPTION OF THE PREFERRED EMBODIMENTS

Figure 1:
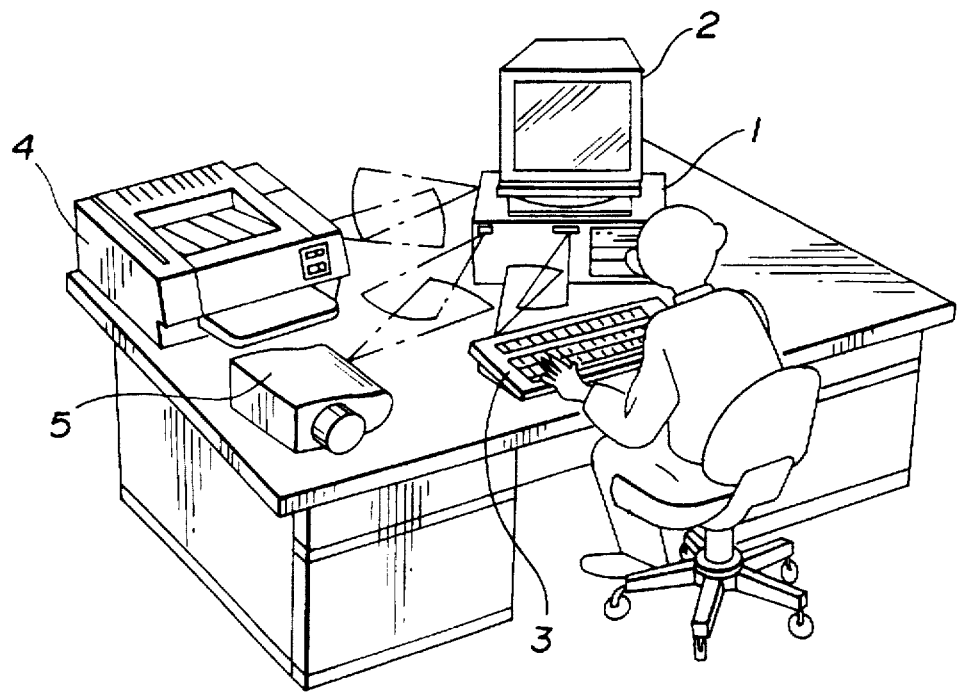
FIG. 1 shows a structure of a computer system using the radio signal transmission system for data signals using infrared rays in accordance with the IrDA standard.

Referring to the drawings, preferred embodiments of the present invention will be explained in detail.

In the following description, a connector apparatus for interconnecting electronic equipment, such as a personal computer and a printer as a peripheral device, is taken as an example.

Figure 2:
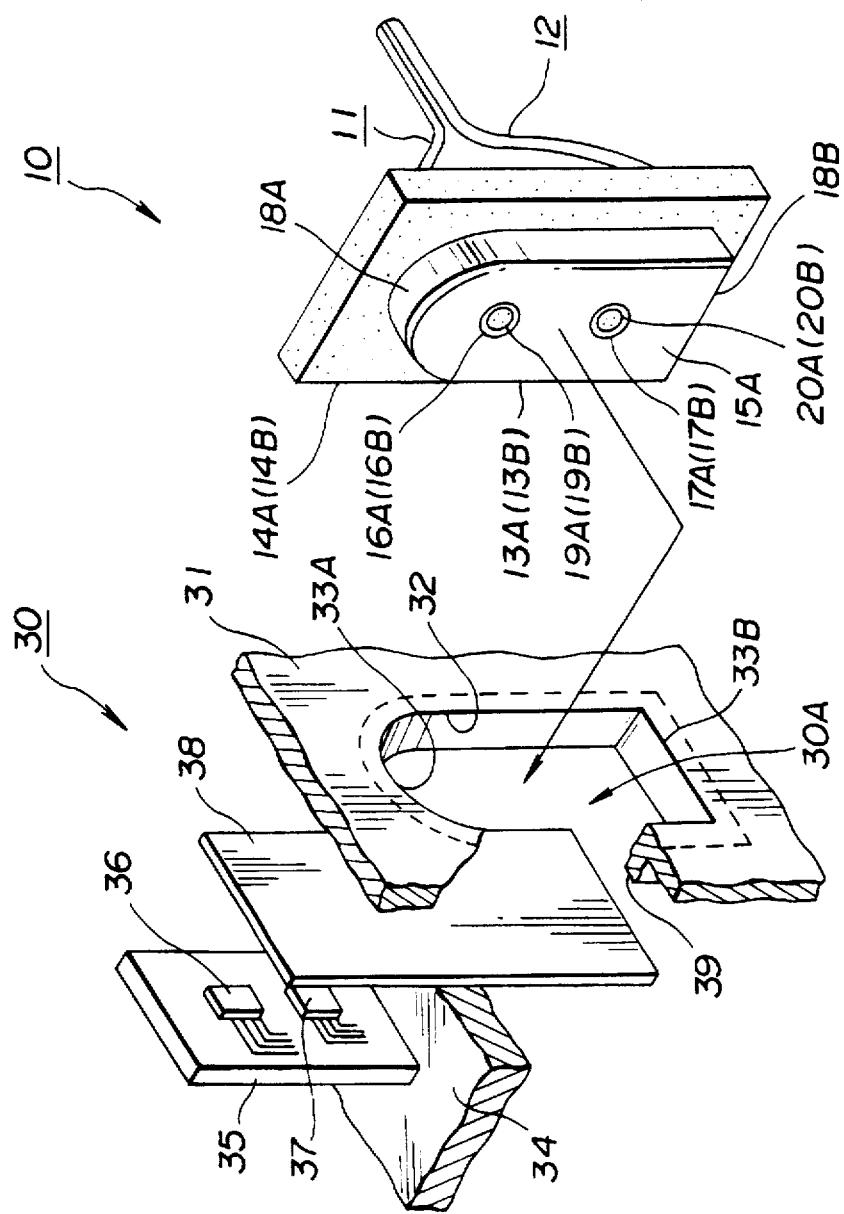
FIG. 2 is a schematic exploded perspective view for illustrating the connector apparatus according to the present invention.
Figure 3:
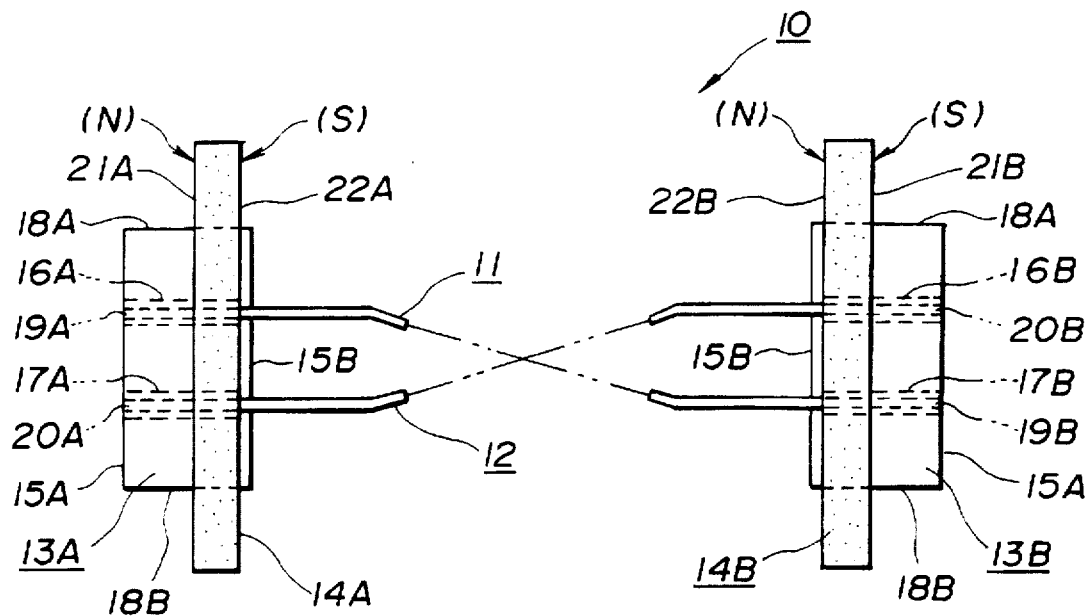
FIG. 3 is a schematic side view showing the connector apparatus shown in FIG. 2.
Figure 4:
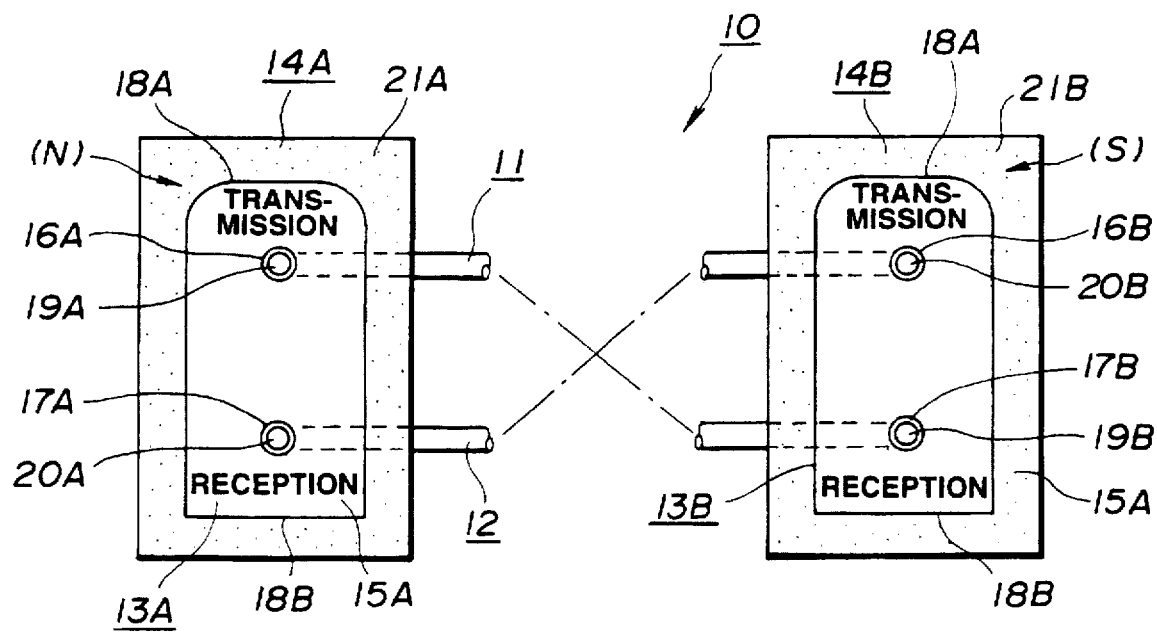
FIG. 4 is a schematic front view showing the connector apparatus shown in FIG. 2.

The connector apparatus embodying the present invention is connected to two pieces of electronic equipment 30, 30 constructed in accordance with design statements conforming to the IrDA standard for enabling exchange of data signals between these pieces of equipment 30, 30 in accordance with the IrDA standard. FIGS. 2 to 4 illustrate a first embodiment of the present invention in which a connector apparatus 10 is made up of a pair of optical fibers 11, 12, a pair of fitting members 13A, 13B in which are inserted and secured both ends 19, 20 of the optical fibers 11, 12, and a pair of magnet members 14A, 14B. The fitting members 13A, 13B constitute fitting means fitted to a data transmission/reception unit 30A of each pieces of equipment 30.

For the optical fibers 11, 12, multi-mode optical fibers 50 to 100 m in diameter, frequently used for transmission of data signals in general, are used. Each of the optical fibers 11, 12 is made up of a core and a cladding surrounding the outer periphery of the core, in a known manner. The light entering one of ends 19A, 20A of the optical fibers 19, 20 is conducted in the optical fibers 19, 20 substantially without leakage to the outside so as to be radiated at the opposite ends 19B, 20B. Moreover, the optical fibers 11, 12 are sufficiently flexible over their entire lengths. The optical fibers 11, 12 may have their outer peripheral surfaces covered with a protective coating.

Each of the fitting members 13A, 13B is molded from an electrically insulating synthetic resin material substantially in the shape of a rectangular block, and has a major surface 15A and an opposite side major surface 15B through which are bored first optical fiber fitting holes 16A, 16B and second optical fiber fitting holes 17A, 17B spaced apart from the holes 16A, 16B in the longitudinal direction (in the up-and-down direction in FIGS. 2 and 3).

Each of these fitting members 13A, 13B has a longitudinal lateral side 18A formed as an arcuately-contoured peripheral surface and an opposite lateral side 18B formed as a planar peripheral surface, thus presenting a substantially horse-shoe shape non-symmetrical with respect to the longitudinal direction, as shown in FIG. 2. With the fitting member 13A, the first fitting hole 16A of the arcuately-contoured peripheral lateral surface 18A is used for transmission, while the second fitting hole 17A of the planar peripheral lateral surface 18B is used for reception, as shown in FIG. 4. Similarly, with the fitting member 13B, the first fitting hole 16B of the arcuately-contoured peripheral lateral surface 18A is used for transmission, while the second fitting hole 17B of the planar peripheral lateral surface 18B is used for reception, as shown in FIG. 4.

Therefore, the lateral sides 18A, 18B of the fitting member 13A in the longitudinal direction constitute portions setting the relative position of the optical fibers 11, 12 with respect to a light emitting elements 36 and a light receiving element 37 of a piece of electronic equipment 30, as will be explained subsequently. Meanwhile, the outer peripheral edges of the major surfaces 15A of the fitting members 13A, 13B are chamfered so as to operate for guiding the fitting members when the fitting members are fitted into the data transmission/reception unit 30A of the electronic equipment 30, as will be explained subsequently.

With the above-described fitting members 13A, 13B, both ends 19, 20 of the optical fibers 11, 12 are introduced from the major surfaces 15B into the first fitting holes 16A, 16B and the second fitting holes 17A, 17B to the side of the opposite major surfaces 15A so as to be secured in position. In this case, the ends 19A, 19B, 20A and 20B of the optical fibers 11, 12 are exposed to the outside at the major surfaces 15A.

The end 19A of the optical fiber 11 is inserted and secured in the first fitting hole 16A of the arcuately-contoured lateral surfaces 18A of the fitting member 13A, while the end 20A of the opposite side optical fiber 12 is inserted and secured in the second fitting hole 17A of the planar lateral surfaces 18B thereof, as shown in FIGS. 3 and 4.

The optical fibers 11, 12 are twisted partway so as to be guided from the fitting member 13A towards the opposite side fitting member 13B so that the ends 19A and 20B thereof are inserted and held in the first fitting holes 16A, 16B, respectively, and the ends 20A and 19B are inserted and held in the second fitting holes 17A, 17B, respectively, as shown in FIGS. 3 and 4. The end 20B of the optical fiber 12 is inserted and held in the first fitting hole 16B of the arcuately-contoured lateral side 18A of the fitting member 13B, as shown in FIGS. 3 and 4. The end 19B of the optical fiber 11 is inserted and held in the first fitting hole 17B of the planar lateral side 18B of the fitting member 13B, as shown in FIGS. 3 and 4.

The ends 19A, 19B, 20A and 20B of the optical fibers 11, 12 are held and secured by the fitting members 13A, 13B so that the arcuately-contoured lateral sides 18A and the planar lateral side 18B serve as the transmission side end and as the reception side end, respectively. Stated differently, when the fitting members 13A, 13B are fitted to the data transmission/reception unit 30A of the electronic equipment 30, as later explained, the arcuately-contoured lateral sides 18A and the planar lateral side 18B of the fitting members 13A, 13B constitute position setting portions for setting the relative positions of the optical fibers 11, 12. These position setting portions inhibit rotation of the fitting members 13A, 13B when the fitting members 13A, 13B are fitted to the data transmission/reception unit 30A, as indicated by arrow A in FIG. 2. In addition, the position setting portions set the orientation of the fitting members 13A, 13B in the up-and-down direction. The indication transmission and reception is inscribed on the major surfaces 15A of the fitting members 13A, 13B in association with the first fitting holes 16A, 16B and the second fitting holes 17A, 17B, respectively, as shown in FIG. 4.

The magnet members 14A, 14B are larger in area and thinner in thickness than the fitting members 13A, 13B, respectively, and are unified with the fitting members 13A, 13B by outsert molding. Therefore, the magnet members 14A, 14B constitute flanges extended on the entire outer rim portions thereof beyond the outer periphery of the fitting portions 13A, 13B, respectively. These magnet members 14A, 14B are magnetized in the direction of thickness thereof so that the magnetic polarities of the magnet member 14A associated with the fitting member 13A are reversed from those of the magnet member 14B associated with the fitting member 13B.

Referring to FIGS. 3 and 4, the magnet member 14A associated with the fitting member 13A has its major surface 21A magnetized to an N polarity, while having its opposite side major surface 21B magnetized to an S polarity. On the other hand, the fitting member 14B associated with the magnet member 13B has its major surface 21A magnetized to an S polarity, while having its opposite side major surface 21B magnetized to an N polarity.

Of course, the magnet members 14A, 14B may be molded in a frame shape as distinct members from the fitting members 13A, 13B and secured to the outer periphery of the fitting members 13A, 13B. In this case, the magnet members 14A, 14B are molded to the same shape and are in a 180° rotated position with respect to the fitting members 13A, 13B. The magnet members 14A, 14B may be formed as plates each having a pair of through-holes traversed by the optical fibers 11, 12 and secured to the major surfaces 15B of the fitting members 13A, 13B.

Since the magnet members 14A, 14B are magnetized so that the mutually facing major surfaces 22A, 22B and the mutually opposite major surfaces 21A, 21B are of opposite polarities, the magnet members can be magnetically assembled and secured together by abutting the major surfaces 21A, 21B or the major surfaces 22A, 22B together when the connector apparatus 10 is not in use. The connector apparatus 10 can be assembled together compactly without the necessity of using a fastener or the like so that there is no risk of an unneeded force being applied to the connector apparatus thus possibly destructing the optical fibers 11, 12.

The equipment 30 making up the computer system, such as a main computer unit 1 or the peripheral devices 2 to 5, has mounted on a portion of a casing 31 thereof the data transmission/reception unit 30A on which is loaded the above-described connector apparatus 10, as shown in FIG. 2. This data transmission/reception unit 30A is made up of a casing 31, having a fitting hole 32, a circuit board 34 mounted within the casing 31, a data transmission board 35 mounted on the circuit board 34, a light emitting element 36 and a light receiving element 37 loaded on the data transmission board 35, and an infrared filter 38.

The casing 31 constituting the data transmission/reception unit 30A of the equipment 30 is formed of a magnetic material, such as a metallic plate. A magnetic material is classified into a ferromagnetic material which is magnetized by an external magnetic field with less ease but which, once magnetized, continues to be magnetized even on removal of the external magnetic field, and a soft magnetic material which is magnetized with ease by the external magnetic field and which is readily demagnetized on removal of the external magnetic field. The casing 31 is formed of soft magnetic material having high magnetic permeability and low coercivity, such as soft iron or permalloy. For meeting the demand for lightness in weight and improved productivity, the entire casing 31 may be formed of a non-magnetic synthetic resin material and at least the data transmission/reception unit 30A may be insert-molded or otherwise affixed to the casing 31.

The fitting hole 32 is formed in the casing 31 so as to be substantially coextensive as the outer shape of the fitting member 13 of the connector apparatus 10. The fitting hole 32 is generally elongated and horse-shoe shaped in the longitudinal direction and has an inner lateral side 33A in the longitudinal direction thereof formed as an arcuately-contoured surface and an opposite side inner lateral surface 33B in the same longitudinal direction formed as a planar surface, as shown in FIG. 2. Thus the fitting hole 32 permits the connector apparatus 10 to be connected to the equipment 30 only when one of the fitting members 13A, 13B is inserted therein in the correct position.

The fitting hole 32 may be constituted with a recessed bottom for holding the data transmission board 35 on the recessed bottom. Alternatively, the fitting hole 32 may be designed to hold the light emitting element 36 and the light receiving element 37 on its bottom.

The casing 31 has a reinforcement rib 39 formed on the entire rim portion of the inner surface extending along the open edge of the fitting hole 32, as shown in FIG. 2. This reinforcement rib 39 operates for reinforcing the opening of the fitting hole 32 and for permitting the fitting members 13A, 13B to be fitted in the fitting hole 32 in a stable state.

The reinforcement rib 39 may be formed by partially protuberant plural ribs formed along the open edge of the fitting hole 32.

The circuit board 34 is constituted by a circuit board having loaded thereon a control circuit or a transmission circuit of the equipment 30. The circuit transmission board 35 is arranged at an end of the circuit board 34 proximate to the inner surface of the casing 31. The data transmission board 35 is sized to close the fitting hole 32 and set upright on the circuit board 34 for facing the fitting hole 32. The data transmission board 35 has mounted thereon the light emitting element 36 and the light receiving element 37 facing outside via the fitting hole 32.

On the data transmission board 35 are mounted a modulation circuit, not shown, for converting data signals sent from the transmission controller UART of the equipment 30 into electrical signals, and a transmission circuit, not shown, designed for driving the light emitting element 36. The modulation circuit and the transmission circuit are connected to the light emitting element 36. On the data transmission board 35 is also mounted a reception circuit, not shown, connected to the light receiving element 37 for amplifying and wave-shaping photo-electric data signals received by the light receiving element 37. The above-mentioned circuits may also be mounted on the circuit board 34. The above-mentioned circuits may also be directly mounted on the circuit board 34 via terminals, not shown, with the light emitting element 36 and the light receiving element 37 facing the fitting hole 32.

The IR filter 38 is arranged on the inner surface of the casing 31 for closing the fitting hole 32. The IR filter 38 is mounted with respect to the light receiving element 37 for reducing the white noise or cutting optical noise, such as IR light of a non-specified wavelength or extraneous light, and for correctly detecting the specified IR rays. If the casing 31 is formed by, for example, a metallic plate, the IR filter 38 may be secured to the inner surface of the metal plate or assembled thereto via a magnet holder. If the casing 31 is molded from a synthetic resin, the IR filter 38 is assembled to a metallic plate having a fitting hole 32 which is unified to the casing 31.

Among the pieces of equipment 30, data signals are exchanged based on the IrDA protocol via the connector apparatus 10 loaded on the data transmission/reception units 30A. The connector apparatus 10 is connected to the equipment 30 by having the fitting member 13 fitted in the fitting hole 32 formed in the data transmission/reception unit 30A. In this case, the connector apparatus 10 can be inserted into the data transmission/reception unit 30A only when the fitting member 13 fits into the fitting hole 32. The connector apparatus 10 is loaded on the equipment 30 with the fitting member 13A fitting in the fitting hole 32 under the magnetic force of the magnet member 14A acting on the casing 31, as shown for example in FIG. 2. When the connector apparatus 10 is mounted in this manner on the equipment 30, the fitting member 13A faces the data transmission board 34 via the IR filter 38.

With the connector apparatus 10, the fitting member 13A is connected to the data transmission/reception unit 30A of the main computer unit 1 shown in FIG. 1, while its other fitting member 13B is connected to the data transmission/reception unit 30A of the printer 4. The one end 19A of the first optical fiber 11 of the fitting member 13A faces the light emitting element 36 of the main computer unit 1, while the opposite end 20A of the second optical fiber 12 of the fitting member 13A faces the light receiving element 37. The opposite side end 19B of the first optical fiber 11 of the opposite side fitting member 13B faces the light receiving element 37 of the printer 4, while the opposite side end 20B of the second optical fiber 12 faces the light emitting element 36 of the printer 4.

With the connector apparatus 10, if data signals are transmitted from the main computer unit 1 shown in FIG. 1 to the printer 4, the light emitting element 36 of the main computer unit 1 is turned on and off based on the data signals for conducting the outgoing infrared light via the end 19A into the inside of the first optical fiber 11. The infrared light derived from the data signals is conducted through the inside of the first optical fiber 11 efficiently without optical loss to the opposite end 19B so as to be radiated outside. The infrared light is received by the light receiving element 37 on the printer 4.

Also, with the connector apparatus 10, if data signals are transmitted from the printer 4 to the main computer unit 1, the light emitting element 36 of the printer 4 is turned on and off based on the data signals for conducting the outgoing infrared light via the end 20B into the inside of the second optical fiber 12. The infrared light derived from the data signals is conducted through the inside of the second optical fiber 12 efficiently without optical loss to the end 20A so as to be radiated outside. The infrared light is received by the light receiving element 37 on the main computer unit 1. The connector apparatus 10 permits the data signals to be transmitted in this manner between the main computer unit 1 and the printer 4 by the fitting members 13A, 13B provided on both sides of the connector apparatus 10 being fitted to the data transmission/reception unit 30A of the printer 4.

Figure 5:
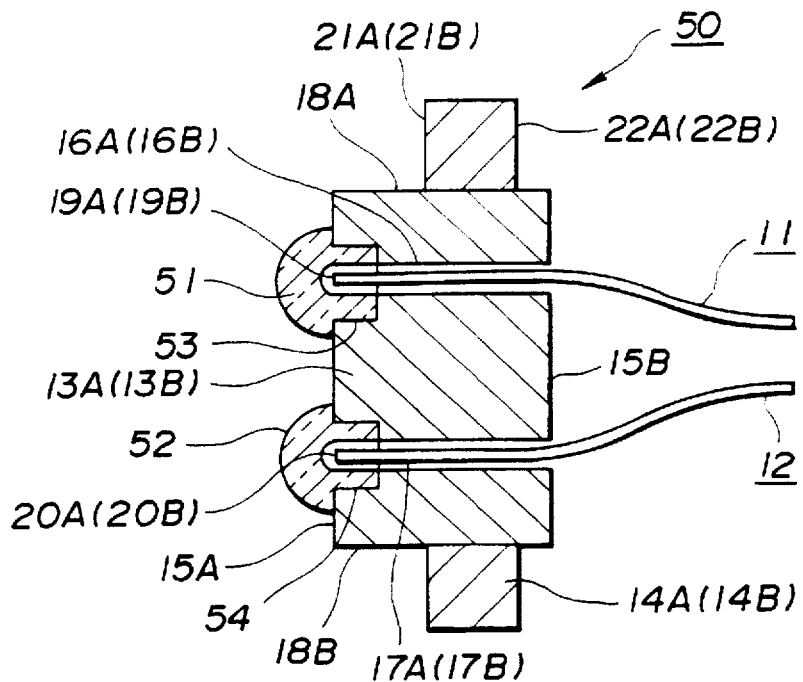
FIG. 5 is a schematic longitudinal cross-sectional view showing a connector apparatus according to a second embodiment of the present invention.
Figure 6:
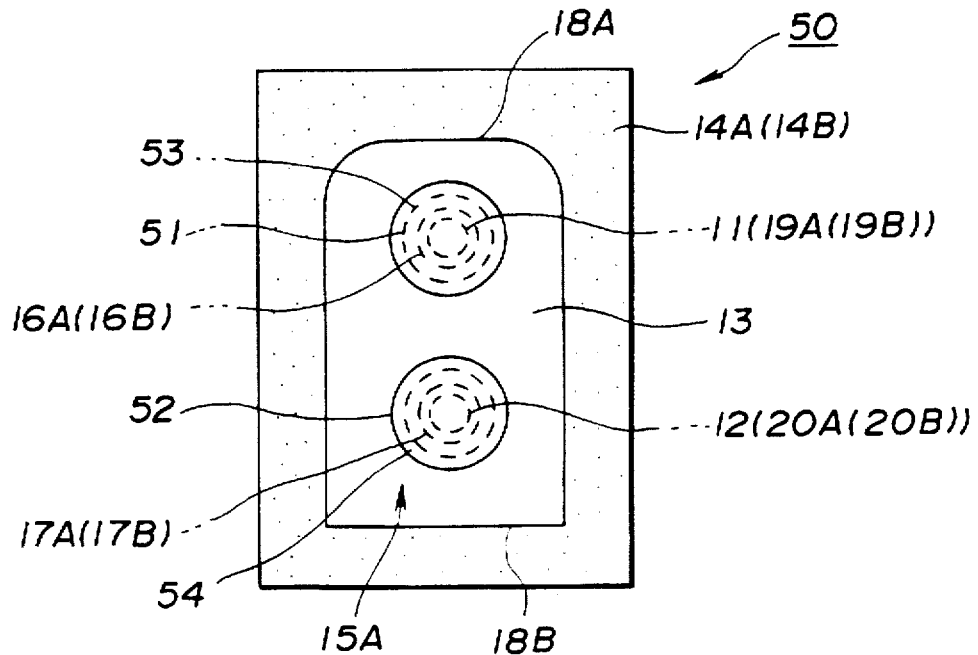
FIG. 6 is a schematic front view showing the connector apparatus shown in FIG. 5.

Referring to FIGS. 5 and 6, a connector apparatus according to the second embodiment of the present invention is explained. A connector apparatus 50 according to the second embodiment has a first lens member 51 for light collection and a second lens member 52 for light collection mounted on the fitting member 13 in association with the first optical fiber 11 and the second optical fiber 12, respectively. In the following description of the connector apparatus 50, the parts or components which are the same or equivalent to those of the connector apparatus 10 of the previous embodiment are denoted by the same reference numerals and the corresponding descriptions are omitted for simplicity.

The connector apparatus 50 has, on the major surface 15A of the fitting member 13 thereof, a first recess 53 and a second recess 54 in register with the first optical fiber fitting hole 16 and the second optical fiber fitting hole 17, respectively. In these first and second recesses 53, 54 are mounted the first lens member 51 and the second lens member 52, respectively, so that the lens surfaces thereof are directed outside, as shown in FIG. 5.

The first lens member 51 and the second lens member 52 are each made up of a semispherical lens portion, a fitting portion formed upright on the back side of the lens portion and a fiber fitting hole bored for extending from an end face of the fitting portion towards the lens portion. The first lens member 51 and the second lens member 52 are loaded on the major surfaces 15A of the fitting members 13A, 13B by having the fitting portions thereof fitted in the first recess 53 and in the second recess 54, respectively.

With the first lens member 51 and the second lens member 52, thus fitted on the fitting members 13A, 13B, the ends 19A, 19B and 20A, 20B of the first optical fiber 11 and the second optical fiber 12, respectively are inserted into the associated fiber fitting holes. In this case, the ends 19A, 19B and 20A, 20B of the first optical fiber 11 and the second optical fiber 12, respectively are positioned in register with the focal points of the lenses of the first lens member 51 and the second lens member 52.

With the connector apparatus 50, constructed as described above, the fitting members 13A, 13B are fitted to the data transmission/reception units 30A of the printer 4 and the main computer unit 1 in order to permit data signal transmission between the main computer unit 1 and the printer 4. The connector apparatus 50 conducts the infrared light radiated in the main computer unit 1 or the printer 4 shown in FIG. 1 by the light emitting element 36 being turned on and off based on the data signals via the first lens member 51 or the second lens member 52 to the first optical fiber 11 or the second optical fiber 12, respectively.

With the connector apparatus 50, since the ends 19A, 19B, 20A, 20B of the first optical fiber 11 and the second optical fiber 12 are positioned facing the focal points of the first lens member 51 or the second lens member 52, respectively, as described above, the infrared light derived from the data signals is conducted in the condensed state to the inside of the first optical fiber 11 or the second optical fiber 12. Thus the connector apparatus 50 transmits the infrared light derived from the data signals highly efficiently between the main computer unit 1 and the printer 4.

Figure 7:
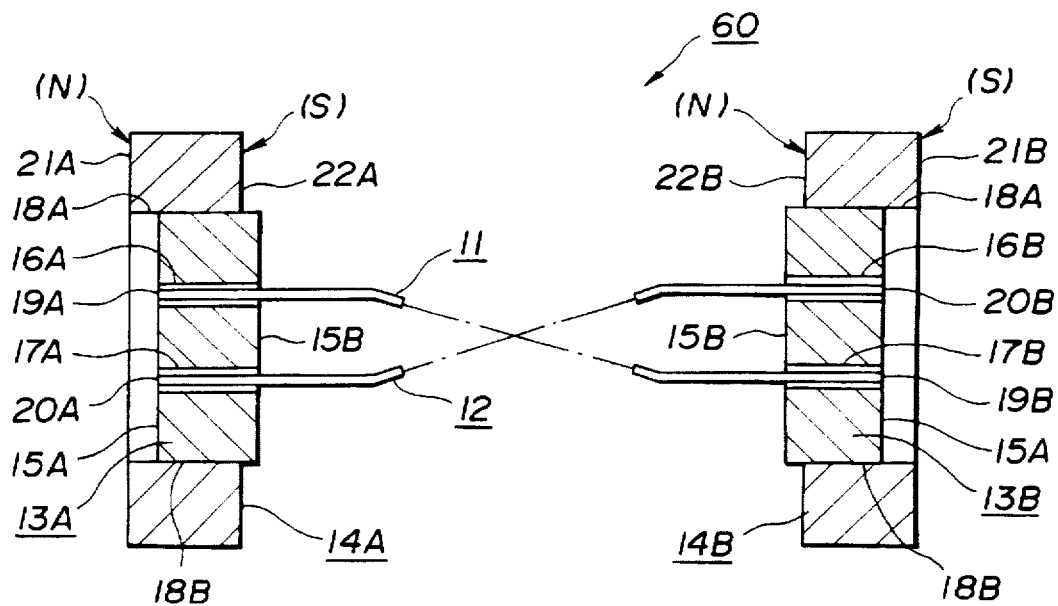
FIG. 7 is a schematic longitudinal cross-sectional view showing a connector apparatus according to a third embodiment of the present invention.

Referring to FIG. 7, a connector apparatus according to a third embodiment of the present invention will be explained. In the present embodiment, the connector apparatus 60 is constructed so as to be compact in the transporting or storage state and so as to prevent destruction of the ends 19A, 19B, 20A, 20B of the first optical fiber 11 and the second optical fiber 12. In the following description of the connector apparatus 60, the parts or components which are the same as or equivalent to those of the connector apparatus 10 of the previous embodiment are denoted by the same reference numerals and the corresponding description are omitted for simplicity.

With the connector apparatus 60 of the third embodiment, shown in FIG. 7, one of major surfaces 21A, 21B of the magnet members 14A, 14B constituting the suction surfaces for the data transmission/reception units 30A of the equipment 30 are protruded from the one of major surfaces 15A of the fitting members 13A, 13B. Stated differently, the major surfaces 15A of the fitting members 13A, 13B of the connector apparatus 60 constituting the suction surfaces for the data transmission/reception units 30A of the equipment 30 are recessed for avoiding direct exposure of the ends 19A, 19B, 20A, 20B of the first optical fiber 11 or the second optical fiber 12 to the suction end faces. The major surfaces 21A, 21B constituting the suction surfaces of the magnet members 14A, 14B are magnetized to mutually opposite polarities, as described previously.

Although not shown, the fitting holes 32 of the data transmission/reception units 30A of the equipment 30, to which is connected the connector apparatus 60, are designed as stepped holes. That is, the fitting holes are formed by annular recesses, on which the major surfaces 21A, 21B of the fitting members 13A, 13B are abutted, and annular protrusions disposed on an inner peripheral side of the annular recesses onto which are abutted the major surfaces 15A of the fitting members 13A, 13B. Of course, the annular protrusions are disposed in their entirety inwardly from the surfaces 31 of the equipments 30.

When transported or stored, the above-described connector apparatus 60 is assembled compactly, without the necessity of providing a fastener or the like, by abutting the major surfaces 21A, 21B of the magnet members 14A, 14B for magnetically coupling to each other. Since the major surfaces 15A of the fitting members 13A, 13B of the connector apparatus 60 are designed as recesses, the major surfaces 21A, 21B of the magnet members 14A, 14B are intimately contacted with and coupled in this state to the casings 31. Therefore, the intimate contact between the magnet members 14A, 14B of the connector apparatus 60 may be maintained more reliably.

Since the major surfaces 15A of the fitting members 13A, 13B of the connector apparatus 60 are designed as recesses, the ends 19A, 19B, 20A, 20B of the first optical fiber 11 and the second optical fiber 12 are not exposed directly to outside to prevent possible injury to these ends. Moreover, since the intimate contact is assured by the magnet members 14A, 14B in the state in which the fitting members 13A, 13B of the connector apparatus 60 are fitted in the fitting holes 32 of the data transmission/reception units 30A of the equipment 30, it becomes possible to reduce any adverse effects by extraneous light, thereby improving transmission precision of data signals.

Figure 8:
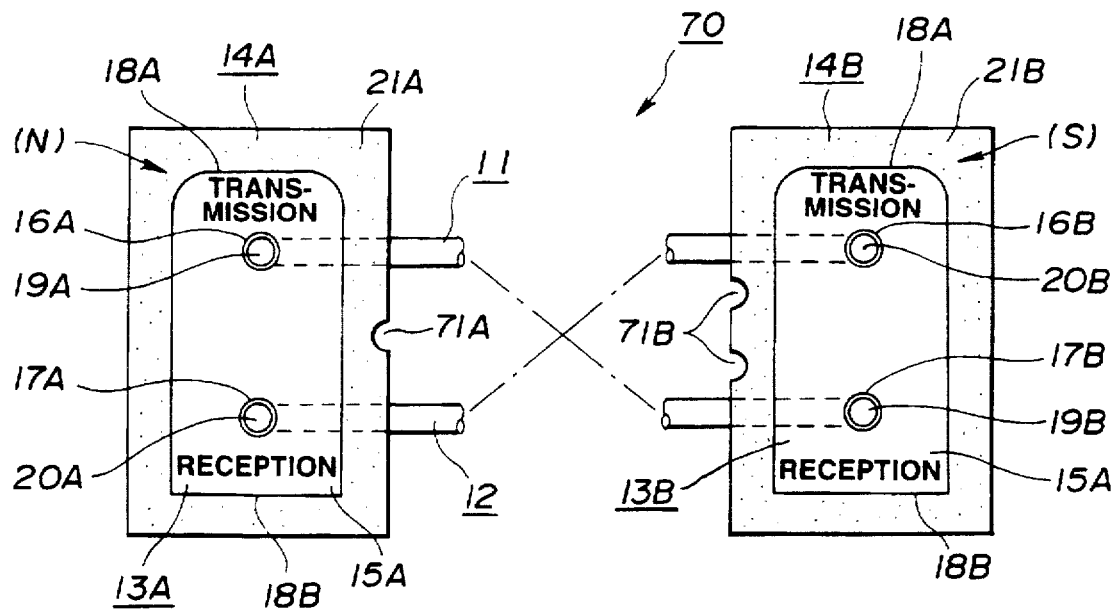
FIG. 8 is a schematic front view showing a connector apparatus according to a fourth embodiment of the present invention.

FIG. 8 shows a connector apparatus according to a fourth embodiment of the present invention. In the connector apparatus 70 of the present fourth embodiment, the fitting members 13A, 13B are combined with the magnet members 14A, 14B in a state in which the relative positions of the optical fibers 11, 12 are positively demarcated from each other, while the fitting members 13A, 13B are positively fitted in the fitting holes 32 of the data transmission/reception units 30A of the equipment 30 for preventing incorrect mounting. In the following description of the connector apparatus 70, the parts or components which are the same as or equivalent to those of the connector apparatus 10 of the previous embodiment are again denoted by the same reference numerals and the corresponding descriptions are is omitted for simplicity.

With the connector apparatus 70, the fitting members 13A, 13B are designed substantially in an elongated horse-shoe shape, and are connectable to the equipment 30 only when the arcuately-contoured lateral sides 18A and the planar lateral sides 18B thereof are matched to the arcuately-contoured inner peripheral sides 33A and the planar inner peripheral sides 33B of the fitting holes 32 of the equipment 30. The connector apparatus 70 is mounted on the data transmission/reception units 30A of the equipment 30 in a state in which the fitting members 13A, 13B and the magnet members 14A, 14B have prescribed the position of the first optical fiber 11 and the second optical fiber 12 by the arcuately-contoured lateral sides 18A and the planar lateral sides 18B thereof and according to the polarities of the major surfaces 21A, 21B.

With the present connector apparatus, since the magnet members 14A, 14B in the elongated rectangular shape are protruded around the rims of the fitting members 13A, 13B, the state of the fitting members cannot be checked in the course of the mounting operation. If the fitting operation for the connector apparatus is done while the operator is unaware of the unfittable state, the fitting members 13A, 13B, fitting holes 32 or the optical fibers 11, 12 tend to be destroyed.

The connector apparatus 70 is formed integrally with discriminating portions 71A, 71B of mutually different shapes on at least one lateral side of the magnet members 14A, 14B for preventing the incorrect mounting. With the connector apparatus 70, the discriminating portion 71A is formed by providing the magnet member 14A with an arcuately-contoured recess, while the discriminating portion 71B is formed by forming two arcuately-shaped recesses in the opposite side magnet member 14B. Although the discriminating portions 71A, 71B are not limited to the arcuately-shaped recesses, they should be distinguishable from appearance or on physical contact.

With the discriminating portion 71A, it can be confirmed that the end 19A of the first optical fiber 11 is the transmitting side and the end 20A of the second optical fiber 12 is the receiving side, while the fitting surface of the magnet member 14A is an N-pole. With the discriminating portion 71B, it can be confirmed that the end 19B of the first optical fiber 11 is the receiving side and the end 20B of the second optical fiber 12 is the transmitting side, while the fitting surface of the magnet member 14B is an S-pole.

Figure 9:
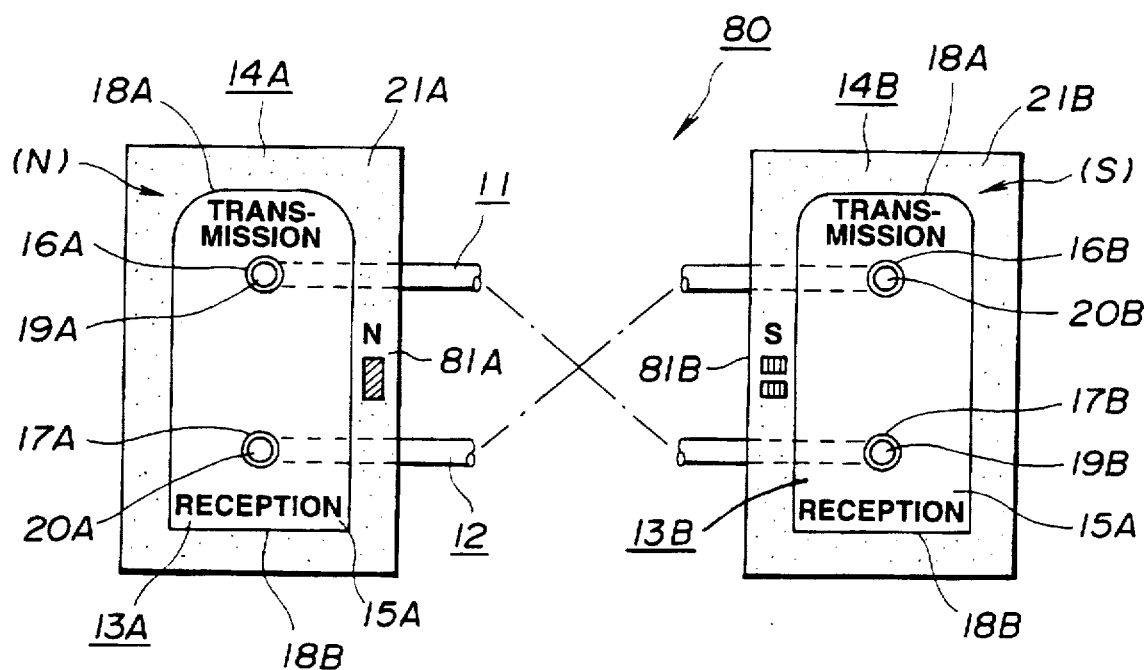
FIG. 9 is a schematic front view showing a modification of a connector apparatus according to the present invention.

In the connector apparatus 80, shown in FIG. 9, the magnet members 14A, 14B are formed with fitting surfaces, while portions of the major surfaces 21A, 21B are formed with polarity-indicating portions 81A, 81B for indicating magnetic polarities. For example, the polarity indicating portion 81A including pole indication N and a single mark is provided on the major surface 21A of the magnet member 14A, while the polarity indicating portion 81B including pole indication S and two marks is provided on the major surface 21B of the magnet member 14B.

The polarity indicating portion 81A of the magnet member 14A indicates that the end 19A of the first optical fiber 11 is the transmitting side, the end 20A of the second optical fiber 12 is the receiving side and the fitting surface of the magnet member 14A is an N-pole. With the polarity indicating portion 81A, it can be confirmed that the end 19B of the first optical fiber 11 is the receiving side, the end 20B of the second optical fiber 12 is the transmitting side and the fitting surface of the magnet member 14B is an S-pole.

Although the connector apparatus of the above-described embodiments is provided with a pair of optical fibers 11, 12, the present invention is not limited to two optical fibers. Although the respective connector apparatuses are so designed that the fitting members 13A, 13B are designed in a horse-shoe shape, and the arcuately-contoured lateral sides 18A and the planar lateral sides 18B thereof are engaged with the arcuately-contoured inner peripheral sides 33A and the planar inner lateral sides 33B of the fitting holes 32 of the equipment 30, respectively, for mounting the connector apparatus in position, the present invention is not limited to this particular shape of the fitting members 13A, 13B and the fitting holes 32 of the equipments 30. For example, the fitting members 13A, 13B and the fitting holes 32 can be formed in the vertically or horizontally non-symmetrical shape.

Although the fitting portions of the above-described embodiments of the connector apparatus are formed by the fitting members 13A, 13B and the magnet members 14A, 14B assembled to both ends of the optical fibers 11, 12, fitting members may also be formed integrally by combining the fitting members and the magnet members from a synthetic resin material admixed with magnetic powders. In this case, the unitary fitting members may be formed on the outer peripheral portions thereof integrally with retention flanges slightly larger in size than the outer size of the fitting holes 32 of the equipment 30.

Although the connector apparatuses described above are used in a one-for-one relationship with the main computer unit 1 and the printer 4, it is to be noted that the connector apparatuses may also be mounted on plural data transmission/reception units 30A mounted on the main computer unit 1. These connector apparatuses make it possible to transmit data signals, based on the IrDA standard, among plural peripheral devices, such as the monitor 2, keyboard 3 or the external storage device 5.

It is to be noted that, if the connecting side apparatus and the connected side apparatus are installed with the data transmission/reception units 30A facing each other in accordance with the IrDA standards, transmission of data signals can be done between the connecting and connected apparatus without using the above-described connector apparatus. It is therefore unnecessary in the above-described computer system to provide for connectability of the connector apparatus in the data transmission/reception units 30A of the main computer unit 1 and the peripheral devices 2 to 5. The apparatus 30 may also be a notebook-type personal computer, any one of a variety of portable information terminal equipments, or an electronic notebook.

The apparatus may also be a general telephone in which the data communication function for communication of data signals with the host computer is loaded and which is connected to the above-described portable equipment for enabling data communication. Since the data transmission/reception units 30A for the general telephone are configured simply as a recess in appearance, immunity from mischief by an ill-intended person may be assured.

What is claimed is:

1. A connector apparatus for interconnecting at least two pieces of electronic equipment each having an input/output unit including a transmission portion and a reception portion for enabling data transmission/reception between the pieces of electronic equipment, comprising:

a cable; and a pair of connecting portions provided at respective ends of said cable, each connecting portion having a magnet portion for attracting the electronic equipment and a limiting portion for limiting a rotational position at a time of connection thereof to the electronic equipment; wherein, with the ends of said cable connected by said connecting portions to the electronic equipment, the ends of the cable are held in a state of enabling data transmission/reception with the input/output units of the electronic equipment.

2. The connector apparatus as claimed in claim 1 wherein each said connecting portion has a holder for holding one end of said cable and said holder is formed as one with the magnet portion.

3. The connector apparatus as claimed in claim 2 wherein said holder is engaged with an engaged portion formed on the electronic equipment and protrudes from the magnet portion.

4. The connector apparatus as claimed in claim 3 wherein said holder has upper and lower ends formed in an arcuate shape and in a square shape, respectively.

5. The connector apparatus as claimed in claim 2 wherein said holder is formed as one with the magnet portion for forming a recess along the magnet portion.

6. The connector apparatus as claimed in claim 1 wherein the magnet portions provided on said connecting portions are magnetized to opposite polarities.

7. The connector apparatus as claimed in claim 1 wherein discriminating portions are provided in said connecting portions for compatibility with the electronic equipment connected to said connecting portions.

8. The connector apparatus as claimed in claim 1 wherein said cable is an optical fiber.

9. A connector apparatus for interconnecting at least two pieces of electronic equipment each having an input/output unit including a transmission portion and a reception portion for enabling data transmission/reception between the pieces of electronic equipment, comprising:

at least two cables; and a pair of connecting portions for holding both ends of said cables, respectively, each connecting portion having a magnet portion for attracting the electronic equipment and a limiting portion for limiting a rotational position at a time of connection thereof to the electronic equipment; wherein, with the ends of said cables connected by the connecting portions to the electronic equipment, the ends of said cables are held in a state of enabling data transmission/reception with the input/output units of the electronic equipment.

10. The connector apparatus as claimed in claim 9 wherein a first one of said pair of connecting portions has a first cable holding portion as an input end and a second cable holding portion as an output end, a second one of said pair of connecting portions has a third cable holding portion as an input end and a fourth cable holding portion as an output end, one end of a first one of said cables is held by said first cable holding portion, a second end of said first one of said cables is held by said fourth cable holding portion, one end of a second one of said cables is held by said second cable holding portion, and a second end of said second one of said cables is held by said third cable holding portion.

11. The connector apparatus as claimed in claim 10 wherein said first and second cable holding portions are formed as one with a first magnet portion and said third and fourth cable holding portions are formed as one with a second magnet portion.

12. The connector apparatus as claimed in claim 11 wherein said first and second cable holding portions are protruded from said first magnet portion, said first and second cable holding portions are formed as one, said third and fourth cable holding portions are protruded from said second magnet portion, and said third and fourth cable holding portions are formed as one.

13. The connector apparatus as claimed in claim 11 wherein said first and second cable holding portions form recesses along said first magnet portion, said first and second cable holding portions are formed as one, said third and fourth cable holding portions form recesses along with said second magnet portion, and said third and fourth cable holding portions are formed as one.

14. The connector apparatus as claimed in claim 9 wherein the magnet portions provided on said connecting portions are magnetized to opposite polarities.

15. The connector apparatus as claimed in claim 9 wherein discriminating portions are provided in said connecting portions for compatibility with the electronic equipment connected to said connecting portions.

16. A connector apparatus for interconnecting at least two pieces of electronic equipment each having an input/output unit including a light emitting portion and a light receiving portion for enabling data transmission/reception between the pieces of electronic equipment, comprising:

at least two optical fibers; and a pair of connecting portions for holding both ends of said optical fibers, repectively, each connecting portion having a magnet portion for attracting the electronic equipment and a limiting portion for limiting a rotational position at a time of connection thereof to the electronic equipment; wherein, with the ends of said optical fibers connected by the connecting portions to the electronic equipment, the ends of said optical fibers are held at positions facing the input/output unit.

17. The connector apparatus as claimed in claim 16 wherein a first connecting portion has a first optical fiber holding portion as an input end and a second optical fiber holding portion as an output end, a second connecting portion has a third optical fiber holding portion as an input end and a fourth optical fiber holding portion as an output end, one end of a first one of said optical fibers is held by said first optical fiber holding portion, a second end of said first one of said optical fibers is held by said fourth optical fiber holding portion, one end of a second one of said optical fibers is held by said second optical fiber holding portion, and a second end of said second one of optical fibers is held by said third optical fiber holding portion.

18. The connector apparatus as claimed in claim 17 wherein said first and second optical fiber holding portions are formed as one with a first magnet portion and said third and fourth optical fiber holding portions are formed as one with a second magnet portion.

19. The connector apparatus as claimed in claim 18 wherein said first and second optical fiber holding portions are protruded from said first magnet portion, said first and second optical fiber holding portions are formed as one, said third and fourth optical fiber holding portions are protruded from said second magnet portion, and said third and fourth optical fiber holding portions are formed as one.

20. The connector apparatus as claimed in claim 17 wherein said first and second optical fiber holding portions form recesses along with said first magnet portion, said first and second optical fiber holding portions are formed as one, said third and fourth optical fiber holding portions form recesses along said second magnet portion, and said third and fourth optical fiber holding portions are formed as one.

21. The connector apparatus as claimed in claim 16 wherein the magnet portions provided on said connecting portions are magnetized to opposite polarities.

22. The connector apparatus as claimed in claim 16 wherein discriminating portions are provided in said connecting portions for assuring compatibility with the electronic equipment connected to said connecting portions.

* * * * *